United States Patent
Johansson

(12) 
(10) Patent No.: US 6,496,137 B1
(45) Date of Patent: Dec. 17, 2002

(54) GROUND PENETRATING RADAR ARRAY AND TIMING CIRCUIT

(75) Inventor: Bernth A. T. Johansson, Malå (SE)

(73) Assignee: Mala GeoScience AB, Mala (SE)

(*) Notice: Subject to any disclaimer, the term of this patent is extended or adjusted under 35 U.S.C. 154(b) by 0 days.

(21) Appl. No.: 09/658,061

(22) Filed: Sep. 8, 2000

Related U.S. Application Data

(60) Provisional application No. 60/152,607, filed on Sep. 19, 1999.

(51) Int. Cl.$^7$ ................................. G01V 3/12

(52) U.S. Cl. ................ 342/22; 342/82; 342/89

(58) Field of Search .............. 342/22, 73, 82, 342/83, 85, 88, 89, 90, 94, 98, 102, 114, 115

(56) References Cited

U.S. PATENT DOCUMENTS

| | | | | |
|---|---|---|---|---|
| 4,008,469 A | * | 2/1977 | Chapman | 342/22 |
| 4,430,653 A | * | 2/1984 | Coon et al. | 342/22 |
| 4,691,204 A | * | 9/1987 | Hiramoto | 342/22 |
| 5,130,711 A | * | 7/1992 | Kimura et al. | 342/22 |
| 5,420,589 A | * | 5/1995 | Wells et al. | 342/22 |
| 5,835,054 A | * | 11/1998 | Warhus et al. | 342/22 |
| 5,920,285 A | * | 7/1999 | Benjamin | 342/368 |
| 6,002,357 A | * | 12/1999 | Redfern et al. | 342/22 |
| 6,211,807 B1 | * | 4/2001 | Wilkison | 342/22 |

OTHER PUBLICATIONS

Van Deen et al., "Three–Dimensional Ground Probing Radar", Geological Survey of Finland, Special Paper 16, 35–40, 1992, pp. 35–40.

* cited by examiner

Primary Examiner—John B. Sotomayor
(74) Attorney, Agent, or Firm—Faegre & Benson LLP

(57) ABSTRACT

Methods and systems consistent with this invention identify a buried object using array-based ground penetrating radar having a control device, a plurality of transmit antennas, and a plurality of receive antennas. Such methods and systems receive a transmit timing input signal and a receive timing input signal. Such methods and systems comprise a first delay circuit for receiving the transmit timing input signal and generating a number of intermediate transmit timing signals delayed with respect to each other by a delay time, and transmit output switch circuit to select either the transmit timing input signal or a corresponding one of the intermediate transmit timing signals as a corresponding output transmit timing signal. Such methods and systems also comprise a second delay circuit for receiving the receive timing input signal and generating a number of intermediate receive timing signals delayed with respect to each other by the delay time, a shift-delay circuit coupled to the second delay circuit and the receive timing input signal to add the delay time to the intermediate receive timing signals, and a receive output switch circuit to select either the receive timing input signal or a corresponding one of the intermediate receive timing signals as a corresponding output receive timing signal. Such methods and systems also comprise an antenna array comprising a plurality of transmit antennas, a plurality of receive antennas, and means for selectively enabling the transmit and receive antennas to allow each of the receive antennas to receive energy from any one of the transmit antennas.

31 Claims, 16 Drawing Sheets

GROUND PENETRATING RADAR ARRAY AND TIMING CIRCUIT

RELATED APPLICATION

This application claims priority to U.S. Provisional Patent Application Ser. No. 60/152,607, filed on Sep. 19, 1999 entitled "GROUND PENETRATING RADAR ARRAY AND TIMING CIRCUIT," which is herein incorporated by reference in its entirety.

BACKGROUND OF THE INVENTION

1. Field of the Invention

The invention relates to Ground Penetrating Radar (GPR), and more specifically to a GPR antenna array and timing circuit.

2. Description of the Related Art

Unlike upward-looking radar used for air traffic control and meteorology, the antenna array in a GPR is directed toward the ground. For example, GPR is used for geophysical applications such as mapping subsurface strata, locating toxic waste sites for remediation, and detecting of unexploded subsurface ordinance.

A GPR system comprises at least one transmitter that transmits an electromagnetic impulse, usually in the frequency range of 1 MHz to 10 GHz. The system also comprises at least one receiver that receives a reflected waveform. The length of the impulse is adjusted to match the desired frequency range. The desired impulse duration may be expressed in nanoseconds (ns) as 1/f, where f is a center frequency in Gigahertz (GHz). Therefore, a 1 GHz antenna is fed with an impulse of 1 ns duration, a 500 MHz antenna is fed with an impulse of 2 ns duration, and a 100 MHz antenna is fed with an impulse of 10 ns duration. Ideally, this gives the transmitted waves very broad frequency content, centered around the frequency f. In practice, the impulse is between one to two cycles of the frequency. Therefore, GPR systems are sometimes referred to as "impulse" or "ultra-wide band" ("UWB") radars.

Subsurface industries such as construction, utility location, environmental remediation, and unexploded-ordnance detection have long sought safe, reliable, cost-effective methods for "seeing into the ground." The utility location market suffers greatly from inadequate location technologies that result in hundreds of millions of dollars in damages, delays, and lost revenue for utility companies and contractors every year, losses than can be reduced significantly by use of GPR. Three utility locating market segments, other than GPR, can be distinguished by their accuracy and price: (1) One Call; (2) private locating; and (3) subsurface utility engineering (SUE).

"One Call" is a nationwide clearinghouse that provides an alert to all public and private utilities of when and where construction may impact their lines. By law, contractors must register their site with One Call, which in turn contacts all the relevant utilities so they can mark their utility lines. One Call locating systems are based on electromagnetic induction technology that sense current passing through a conductor attached to the underground utility. Utility companies, responding to a One Call work order, guarantee accuracy on conductive lines within twenty-four inches horizontally on either side, with no guarantee of depth. With One Call, utility line locations are simply painted temporarily on the ground, easily subject to erosion or destruction. This poor accuracy results in broken utility lines and revenue loss.

Construction, utility, and industrial companies often relay on "private locating." Private locating provides a greater degree of accuracy than is delivered by One Call. These companies often hire a utility locating company or a geophysics company to apply more expensive and time-consuming locating techniques. Private locating companies typically use electromagnetic induction technology, GPR, and magnetometry. Often this includes excavation, the most reliable and expensive method for determining the exact location of utilities.

Industrial and utility companies, however, frequently require more accurate maps of the subsurface than One Call or private locating can provide. For instance, extra accuracy may be needed while excavating near an oil pipeline because it may be too dangerous to break the pipe. Or, it may be too costly to accidentally cut an interstate fiber optical cable carrying important communications. In such situations, excavators perform a total cost/value analysis, including consideration of risk/cost avoidance. Often, they are more willing to pay higher fees to ensure greater accuracy.

"SUE" can provide more accuracy than One Call or private locating. SUE is a rapidly growing specialty service offered by geophysical and engineering companies. It entails planning and designing utility arrangements before highway or other larger infrastructure construction. SUE engineers painstakingly map all discernible utilities at a given site using a variety of traditional and advanced geophysical methods. SUE uses electromagnetic induction technology, GPR, and magnetometry. It is generally more costly than private locating services because it uses computer aided design to produce a permanent record of the location of utilities. Even this premium service often only identifies 80% of utilities with certainty, frequently less when unknown non-conductive utilities are present. Further, SUE is very expensive.

An advanced GPR system may overcome the disadvantages of One Call, private locating, and SUE by providing a cost effective method to locate and image conductive and non-conductive utilities, vertically and horizontally, with a margin of error to satisfy any excavating needs. An advanced GPR system may also provide a permanent record of images of the excavation site that can be used in the future.

There are technical difficulties that must be address to implement such a GPR system, however. As mentioned above, for instance, GPR, antennae may transmit an impulse signal that lasts for a very short time. Because the center frequency of a GPR system may exceed 10 MHz, there may be no "sampling circuit" whose sampling and digitizing rate is fast enough to sample the whole received waveform at once with a high enough dynamic range. In order to solve this timing problem, it is common to transmit a plurality of impulses, each having the same waveform. Instead of sampling a received waveform multiple times, each of the plurality of received waveforms is sampled only once, but at a different point along the waveform. A signal processor acts upon these sampled points. It is very difficult, however, to accurately schedule the time when each transmitter transmits an impulse signal and when each receiver samples the received waveform. Typical GPR systems cannot accurately schedule the time when each transmitter transmits and when each receiver samples the received waveform in a way optimized for an antenna array.

Currently available systems capable of handling multiple antennas use one digitizing circuit (one A/D converter), and one impulse generation circuit. These systems thus select one pair of antennas and route the generated high-voltage impulse to the transmitter, and the received sampled, analog, value to the single A/D converter. Because of the difficulty of creating high-voltage impulses at a higher rate than approximately 100 KHz, and due to the limited speed of the existing A/D converters with sufficient dynamic range, the data acquisition rate is effectively limited to approximately 100–150 kHz, independent of the number of receiving and transmitting antennas used.

Furthermore, existing systems use combined receiving and transmitting antennas, without the possibility of individually positioning each antenna element to form a suitable antenna array. If the receiving and transmitting antennas are not separate, the array may not have suitable coverage or sufficiently different polarization schemes. Horn antennas may be separable, but may also be unsuitable for GPR applications.

Further, for a GPR system to be practical, it should easily fit onto a moving vehicle, trailer, or portable housing so that subsurface images can be formed as the system is moving. This requirement introduces width and length requirements on the shape, arrangement, and number of transmit and receive antenna.

Thus, there is a need for a highly accurate timing circuit capable of timing multiple transmit and receive antenna to accurately image the subsurface. Further, it is necessary to have a transmit and receive antennas that meet the necessary physical design constraints for a mobile system.

SUMMARY OF THE INVENTION

This summary and the following detailed description should not restrict the scope of the claimed invention. Both provide examples and explanations to enable others to practice the invention. The accompanying drawings, which form part of the detailed description, show several embodiments of the invention and, together with the description, explain the principles of the invention.

Methods and systems consistent with this invention control an impulse radar having a plurality of transmit antennas and a plurality of receive antennas, wherein a control circuit of the radar receives a transmit timing input signal and a receive timing input signal. Such methods and systems delay the transmit timing input signal and generate a number of intermediate transmit timing signals delayed with respect to each other by a delay time, select either the transmit timing input signal or a corresponding one of the intermediate transmit timing signals as a corresponding output transmit timing signal, delay the receive timing input signal and generate a number of intermediate receive timing signals delayed with respect to each other by the delay time, add the delay time to the intermediate receive timing signals, and select either the receive timing input signal or a corresponding one of the intermediate receive timing signals as a corresponding output receive timing signal.

A system consistent with this invention comprises an antenna array. Such an antenna array comprises a plurality of transmit antennas, a plurality of receive antennas, and means for selectively enabling the transmit and receive antennas to allow each of the receive antennas to receive energy from any one of the transmit antennas. In such a system, the plurality of transmit antennas may be linearly arranged, and the plurality of receive antennas may be linearly arranged and parallel to the transmit antennas.

A system consistent with this invention provides a high voltage generator and a high-voltage impulse generator for each transmit antenna, and a sampler and analog to digital converter for each receive antenna.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

Figures 14A, 14B, 14C, 14D:
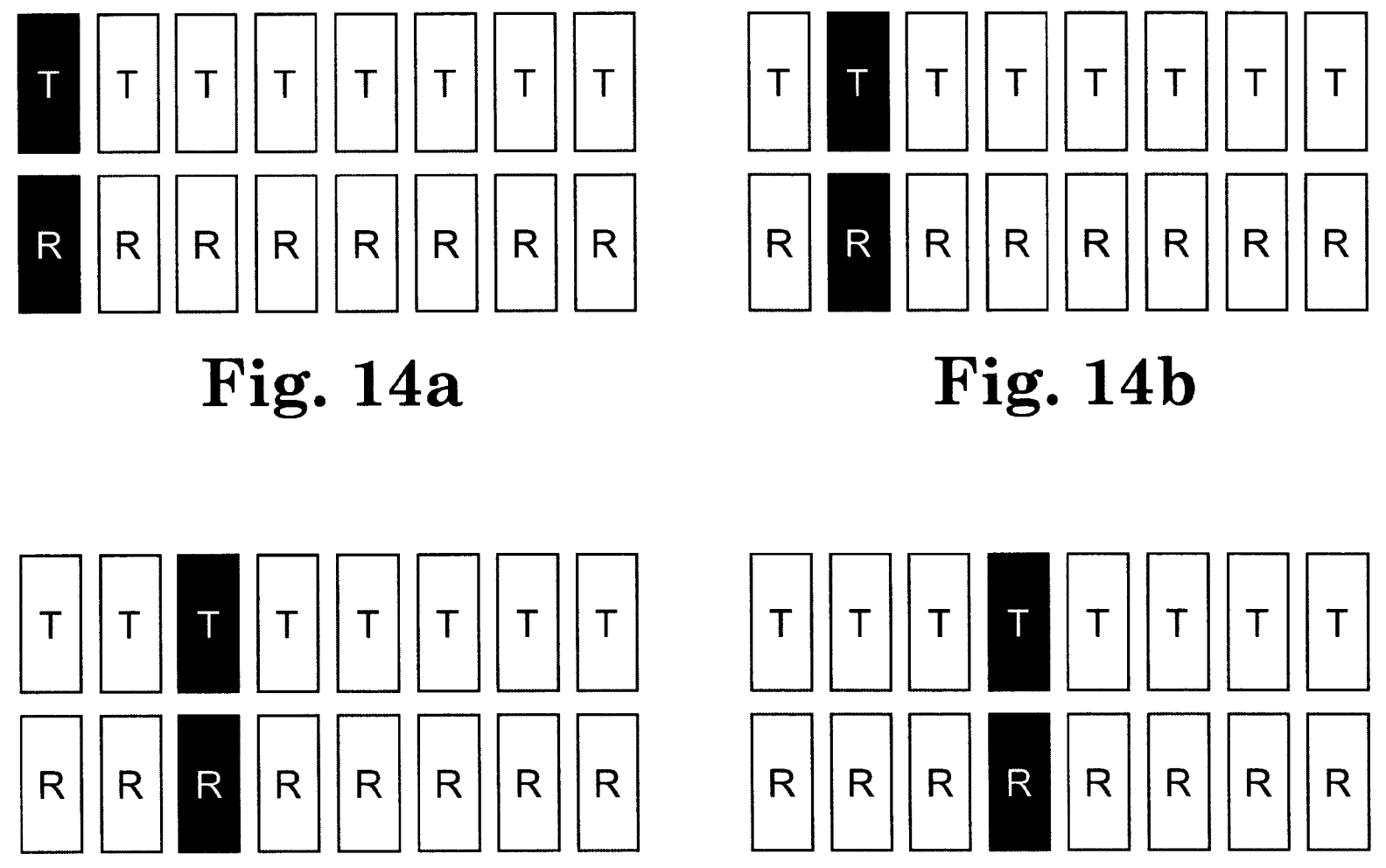

FIGS. 14(a)–14(d) are diagrams, consistent with this invention, of examples of possible antenna pairing scheme for transmit antenna and receive antenna for "monostatic" radar measurement.

DETAILED DESCRIPTION

The following description of embodiments of this invention refers to the accompanying drawings. Where appropriate, the same reference numbers in different drawings refer to the same or similar elements.

Figure 1:
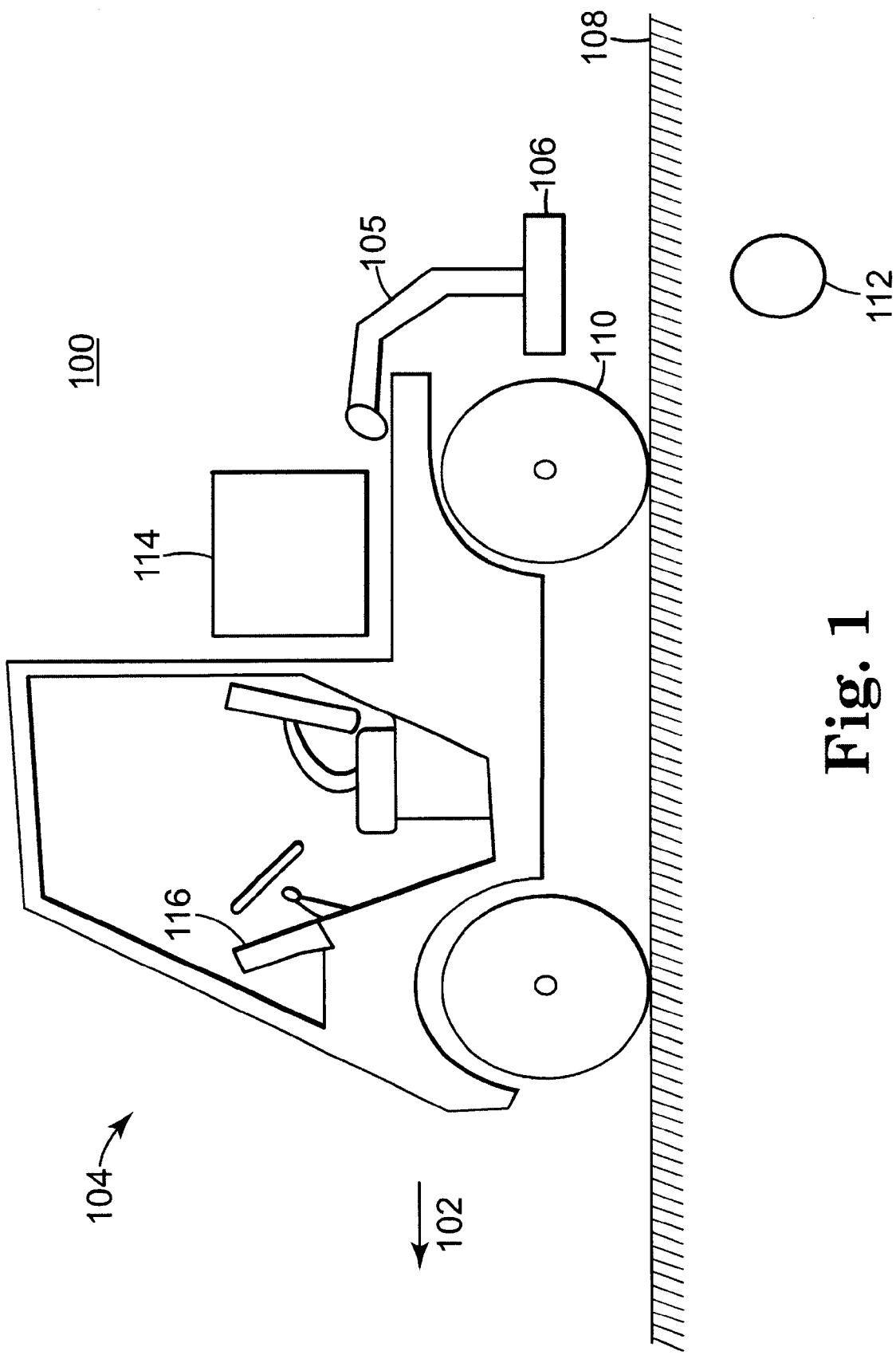
FIG. 1 is a diagram of a mobile vehicle with a GPR system, consistent with this invention.

FIG. 1 is a diagram of a mobile vehicle 104 with a GPR system, consistent with this invention. A radar array 106 attaches to an arm 105, which attaches to the back a vehicle 104, as shown in FIG. 1. Radar array 106 may comprise a plurality of transmit antennas and a plurality of receive antennas. Vehicle 104 may move in direction shown by arrow 102. Radar array 106 transmits impulses into ground 108. The impulses may reflect off of a subterranean pipe 112 and radar array 106 may receive reflected waveforms. Module 114 on the back of vehicle 104 may comprise electronics that control array 106 and process signals received by array 106. It may also display images on display 116 for the operator.

Figure 2:
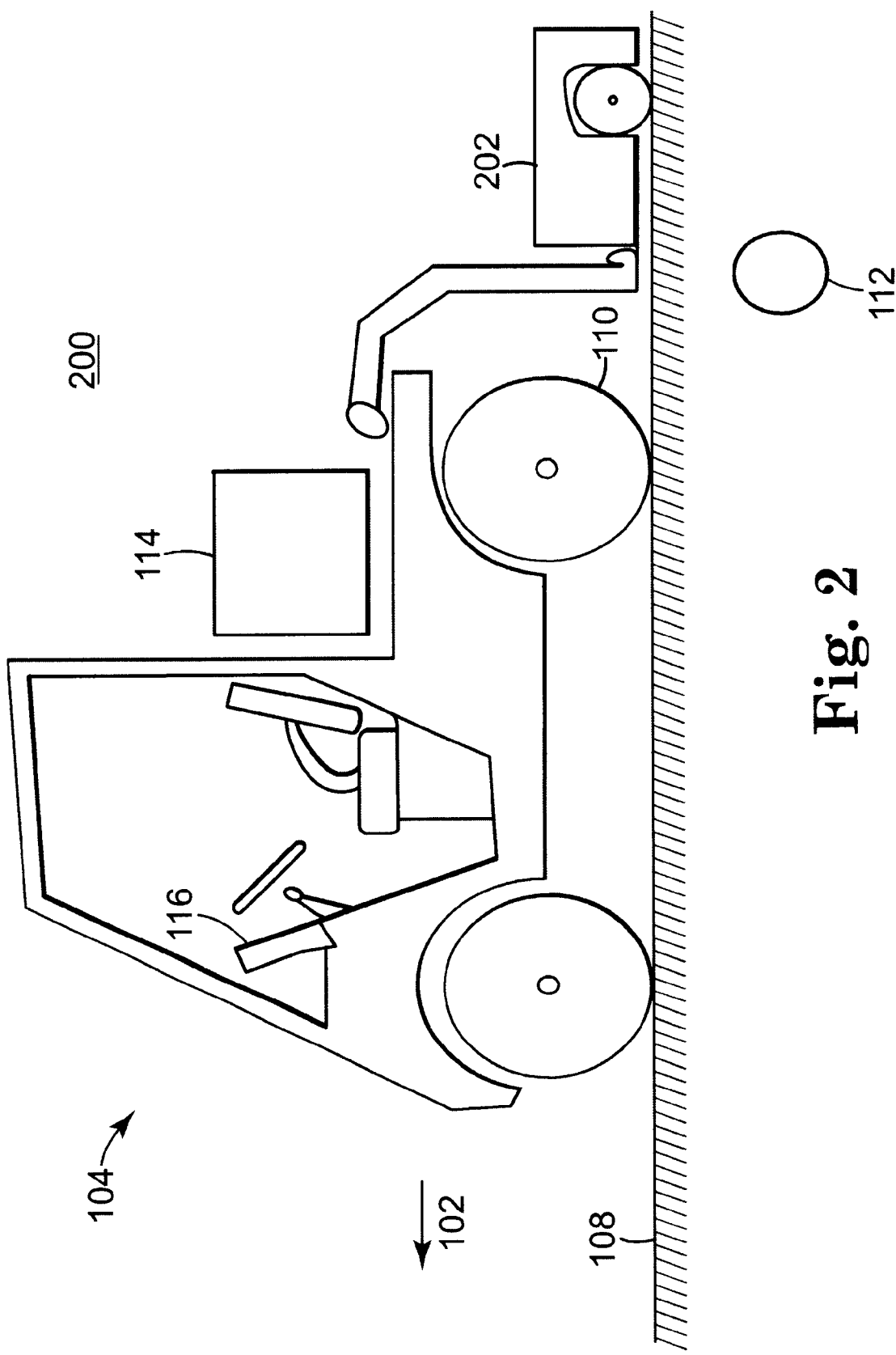
FIG. 2 is a diagram consistent with this invention, of a mobile vehicle with a trailer having a GPR system.
Figure 3:
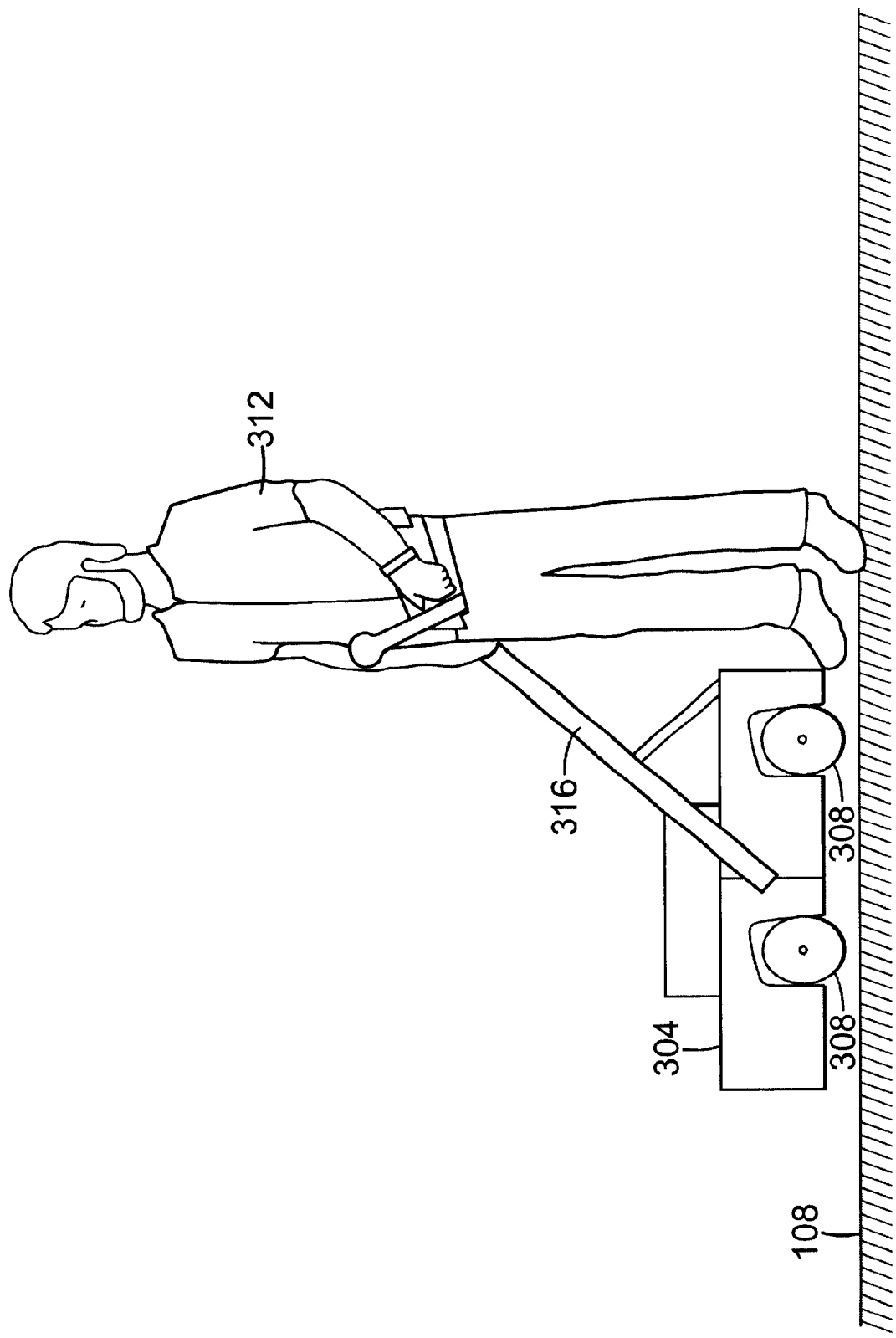
FIG. 3 is a diagram, consistent with this invention, of a portable housing with a GPR system.

FIG. 2 is a diagram, consistent with this invention, of mobile vehicle 104 with a trailer 202 having a GPR system. In this embodiment shown in FIG. 2, radar array 106 (not shown in FIG. 2) is within trailer 202, which is attached to vehicle 104. Trailer 202 moves in the direction of arrow 102 with vehicle 104. FIG. 3 is a diagram, consistent with this invention, of a portable housing 304 with a GPR system. In the embodiment shown in FIG. 3, radar array 106 (not shown in FIG. 3) is within portable housing 304. A user 312 may guide portable housing 304 over ground 108 using a handle 316. Portable housing 304 may have wheels 308. It is possible, however, that portable housing 304 is sufficiently light to omit wheels 308.

Figure 4:
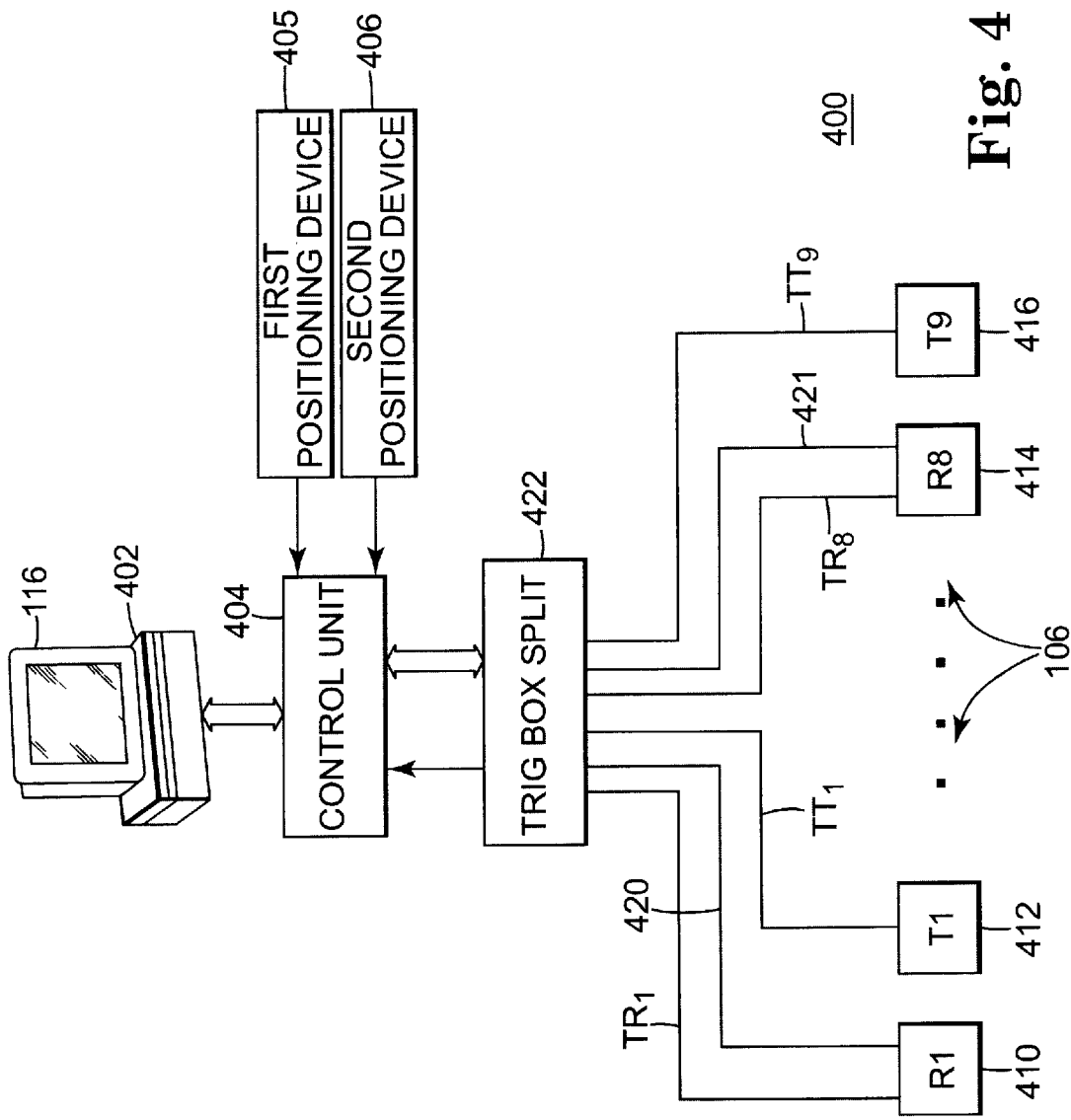
FIG. 4 is a block diagram of a system, consistent with this invention, comprising an antenna array, a trig box, a computer, a control unit, and a positioning device.

FIG. 4 is a block diagram of a system 400, consistent with this invention, comprising antenna array 106, a trig box 422, a control unit 404, a first positioning device 405, a second positional device 406, a computer 402, and a display 116. Antenna array 106 may comprise a plurality of receive antenna R1–R8 and a plurality of transmit antennas T1–T9. Antenna array 106 transmits electromagnetic impulses into the ground and receives reflected electromagnetic waveforms. Trig box 422 outputs trigger signals TT1–TT9 that trigger, i.e., "activate," transmit antennas T1–T9 to transmit an impulse and trigger signals TT1–TT9 that trigger receive antennas R1–R8 to sample a received waveform. For example, signal TR1 triggers when receive antenna R1 samples a received waveform. Signal TR9 triggers when receive antenna R8 samples a received waveform. Likewise, signal TT1 triggers when T1 transmits an impulse. Signal TT9 triggers when antenna T9 transmits an impulse. Similar trigger signals exist for R2–R7 and T2–T8 but are not shown. Trig box 422 is described below in more detail.

Control unit 404 may output timing signals to trig box 422, which trig box 422 uses to create trigger signals TT1–TT9 and TR1–TR8, as explained below. Computer 402 sends and receives signals, including commands, to and from control unit 404 and performs the digital signal processing on received signals and displays images on display 116.

First positioning device 405 may attach to a wheel 110 of vehicle 104, similar to an odometer in an automobile. First positioning divide 405 allows computer 402 to determine the distance vehicle 104 has traveled, as well as speed, velocity, and acceleration. Second positioning device 406 may attach to a different wheel than first positioning device 405. For example, first positioning device 405 may attach to a left rear wheel and second positioning device 406 may attach to a right rear wheel. In this case, the current direction of movement of the antenna array may be determined, with respect to a start direction, by calculating the difference in traveled distance between first and second positioning devices 405, 406.

As described above, antenna array 106 may comprise eight receive antennas R1–R9, and nine transmit antennas T1–T9. In FIG. 4, only receive antennas R1 and R8 and transmit antenna T1 and T9 are shown. The configuration of array 106 is described in more detail below, along with alternative configurations.

Trig box 422 may also input sampled waveforms on lines 420 and 421 from receive antennas R1–R8, which information will eventually be passed to computer 402 via control unit 404. For example, waveform on line 420 is a sampled waveform from receive antenna R1 that feeds into trig box 422. Waveform on line 421 is a sampled waveform from receive antenna R8 that feeds into trig box 422. Other receive antenna R2–R8 similarly have signals that feed into trig box 422 but are not shown in FIG. 4. Sample waveform on lines 420 and 421 are described in more detail below.

Figure 5:
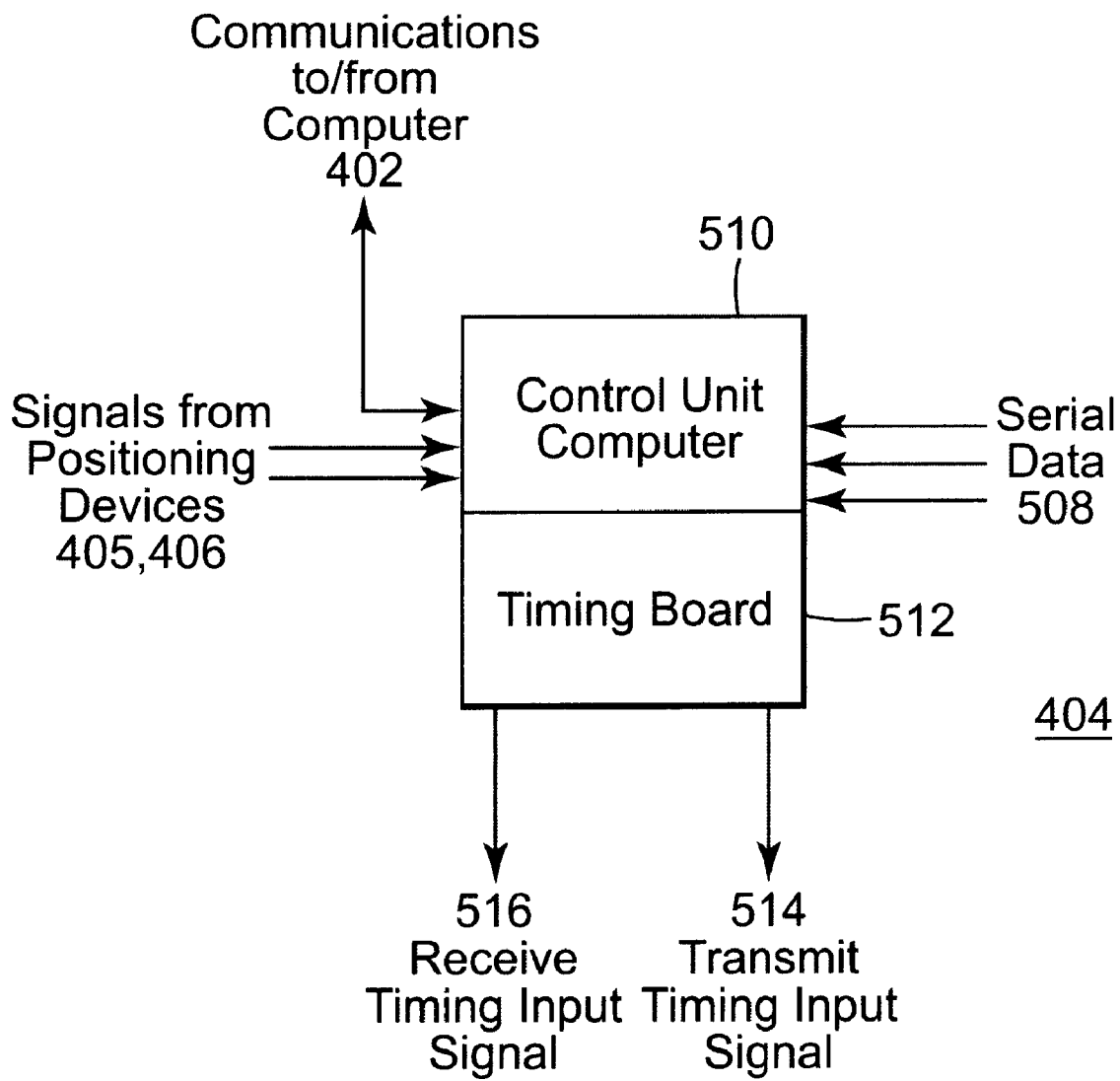
FIG. 5 is a block diagram of components in the control unit of FIG. 4.

FIG. 5 is a block diagram of components in control unit 404 of FIG. 4. Control unit 404 comprises a control unit computer 510 and a timing board 512. Control unit computer 510 controls timing board 512 that generates a transmit timing input signal 514 and a receive timing input signal 516 that are fed into trig box 422. Trig box 422 uses these signals 514, 516 to create trigger signals TT1–TT9 and TR1–TR8. Control unit computer 510 also sends and receives data to and from personal computer 402. Control unit computer 510 also receives signals from positioning devices 405, 406 and other serial data 508. Other serial data 508 may include sampled waveforms received by trig box 422 and passed to control unit 404.

Figure 6:
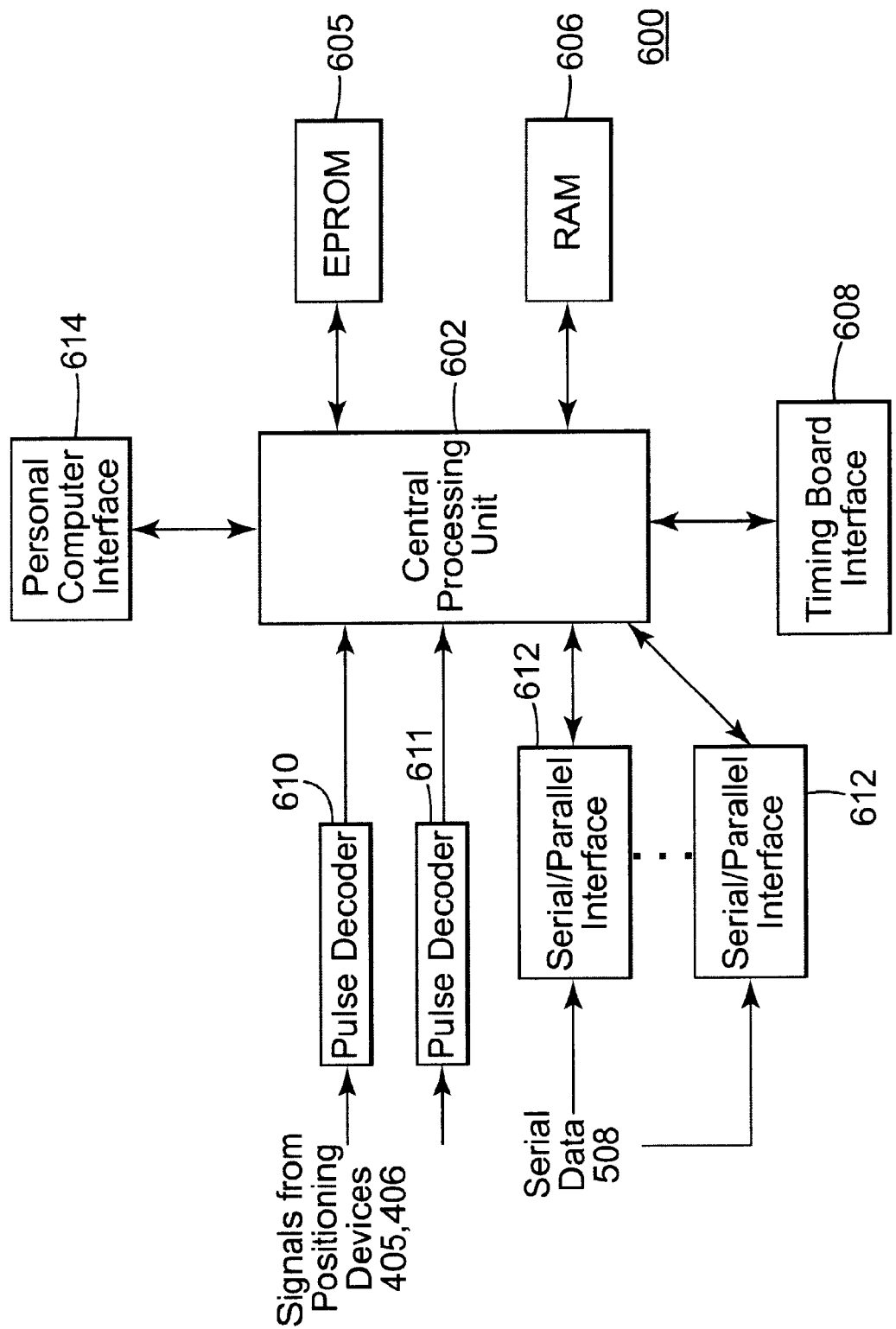
FIG. 6 is a block diagram of the control unit computer of FIG. 5 comprising a central processing unit (CPU), a timing board interface, a RAM, an EPROM, one or more serial/parallel interfaces, a personal computer interface, and one or more pulse decoders.

FIG. 6 is a block diagram of control unit computer 510 comprising a central processing unit (CPU) 602, a timing board interface 608, a RAM 606, an EPROM 605, one or more serial/parallel interfaces 612, a personal computer interface 614, and first and second pulse decoders 610, 611. RAM 606 and EPROM 605 store applications and data structures necessary to run programs in CPU 602. Timing board interface 608 interfaces control unit computer 510 with timing board 512. Personal computer interface 614 interfaces control unit computer 510 with personal computer 502. First pulse decoder 610 decodes two pulse trains output from first positioning device 405, one for forward movement and the second for backward movement. By subtracting the backward counted pulses from the forward counted pulses, an absolute position of the device may be calculated. Pulse decoder 611 may perform the same function for second positioning device 406.

Figure 7:
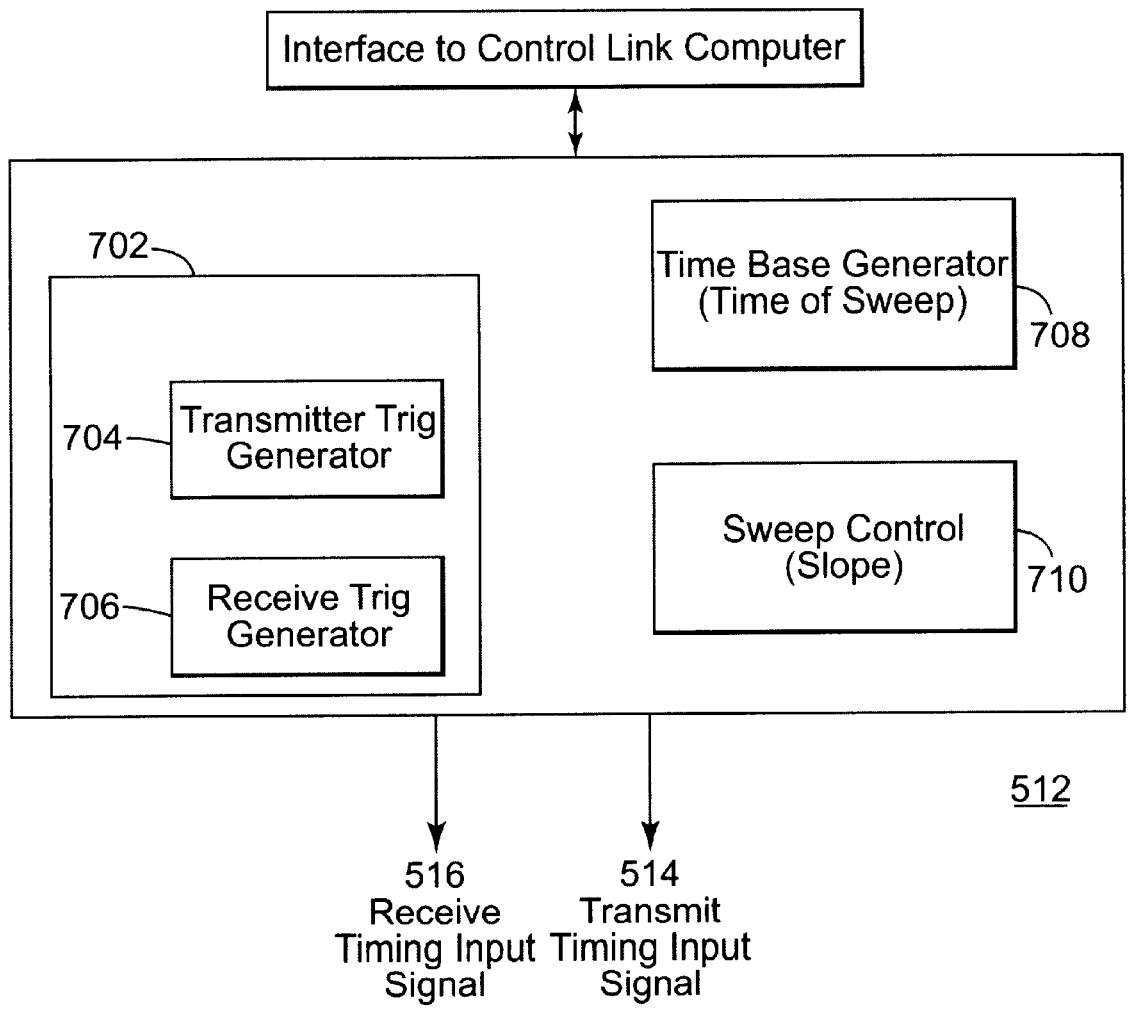
FIG. 7 is a block diagram of the timing board of FIG. 5 comprising a transmitter trig generator, a receiver trig generator, a time base generator, and a sweep control.
Figure 8A:
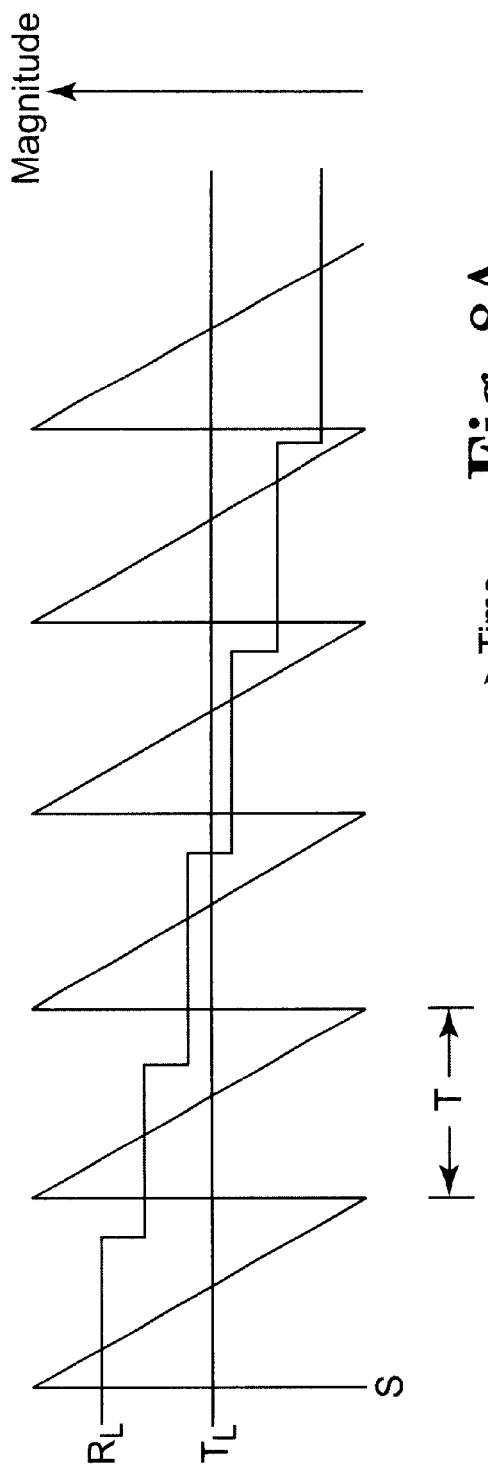
FIG. 8a is a signal diagram, consistent with this invention, of three threshold signals.
Figure 8C:
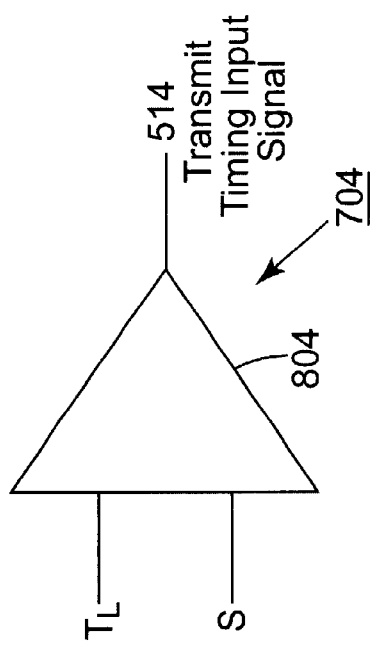
FIGS. 8b–c are diagrams of a transmit timing input signal generator and receive timing input signal generator.
Figure 8B:
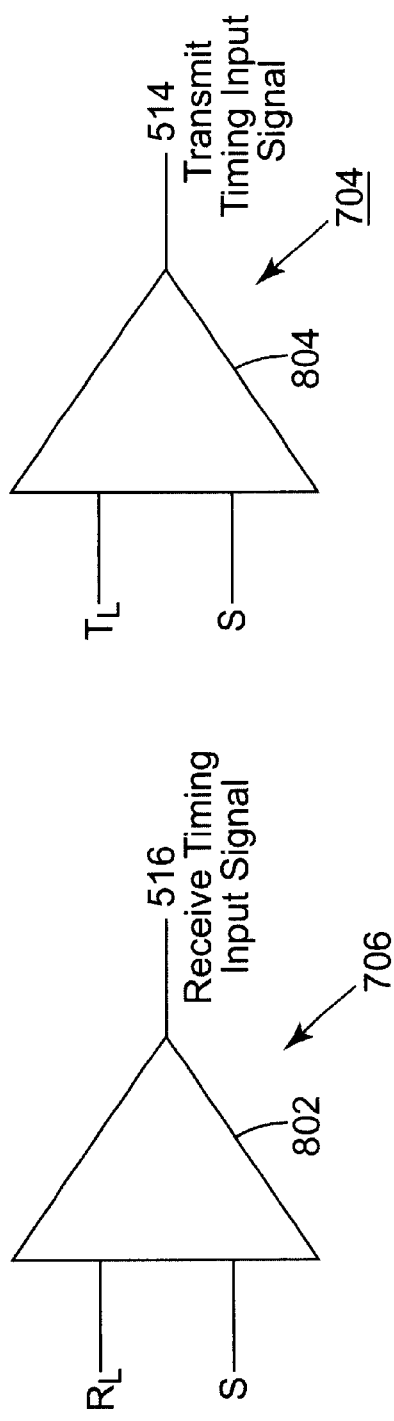

FIG. 7 is a block diagram of timing board 512 including a transmitter trig generator 704, a receiver trig generator 706, a time base generator 708, and a sweep control 710. FIG. 8b–c is a diagram of trig drive circuitry 702 including transmit timing input generator 704 and receive timing input signal generator 706. A system consistent with this invention generates a saw-tooth triangular signal S, a transmit threshold signal $T_L$, and a receive threshold signal $R_L$. FIG. 8a is a signal diagram consistent with this invention, of saw-tooth triangular signals S, transmit threshold signal $T_L$, and receive threshold signal $R_L$. Waveforms S, $T_L$, and $R_L$ may be easily generated by a combination of operational amplifiers and discrete components, as readily known to one of ordinary skill in the art. Transmit threshold $T_L$ may be a constant value, as shown in FIG. 8a. Receive threshold $R_L$ may step from a high level down to a low level by use of a fast D/A converter controlled by computer 510 via interface 608. Sweep control 710 controls the slope of saw-tooth signal S and time base generator 708 controls the period (time base) of saw-tooth signal S.

Figure 10:
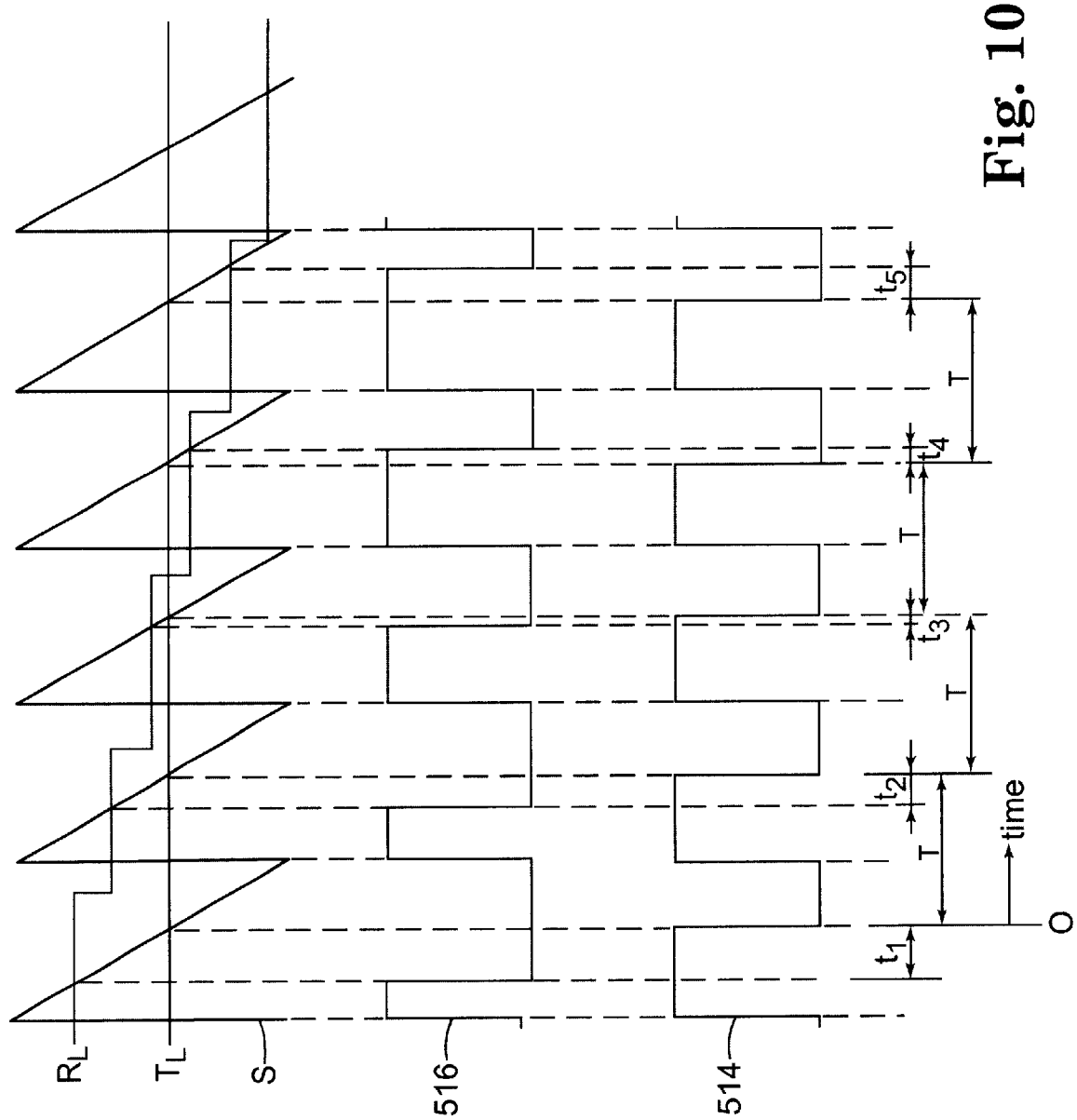
FIG. 10 is a signal diagram of transmit timing input signal and receive timing input signal, consistent with this invention.

Transmitter trig generator 704 may comprise a first comparator 804. First comparator 804 compares transmit threshold signal $T_L$ and saw-tooth signal S. When transmit threshold $T_L$ is less than saw-tooth signal S, then comparator 804 outputs a high voltage as transmit timing input signals 514, as shown in FIG. 10. When transmit threshold $T_L$ is grater than triangular signal S, then comparator 804 outputs a low voltage signal as transmit timing input signal 514, also as shown in FIG. 10. Thus, transmit timing input signal 514 is a periodic square wave.

Receiver trig generator 706 may comprise a second comparator 802. Second comparator 802 compares a receive threshold signal $R_L$ and saw-tooth signal S. When receive threshold $R_L$ is less than saw-tooth signal S, then comparator 802 outputs a high voltage as receive timing input signal 516, as shown in FIG. 10. When receive threshold signal $R_L$ is greater than saw-tooth signal S, then comparator 802 outputs a low voltage signal as receive timing input signal 516, also as shown in FIG. 10. Thus, receive timing input signal 516 is a square wave that has a varying width. The width of receive timing input signal 516 is narrow and then gradually become wider, only to repeat itself.

The period of transmit timing input signal 514 is dependent on the slope and time period (time base) of saw-tooth signal S. As mentioned above, the slope of saw-tooth signal S is controlled by control unit computer 510 by sweep control 710. The period (time base) of saw-tooth signal S is controlled by control unit computer 510 and time base generator 708.

Figure 9:
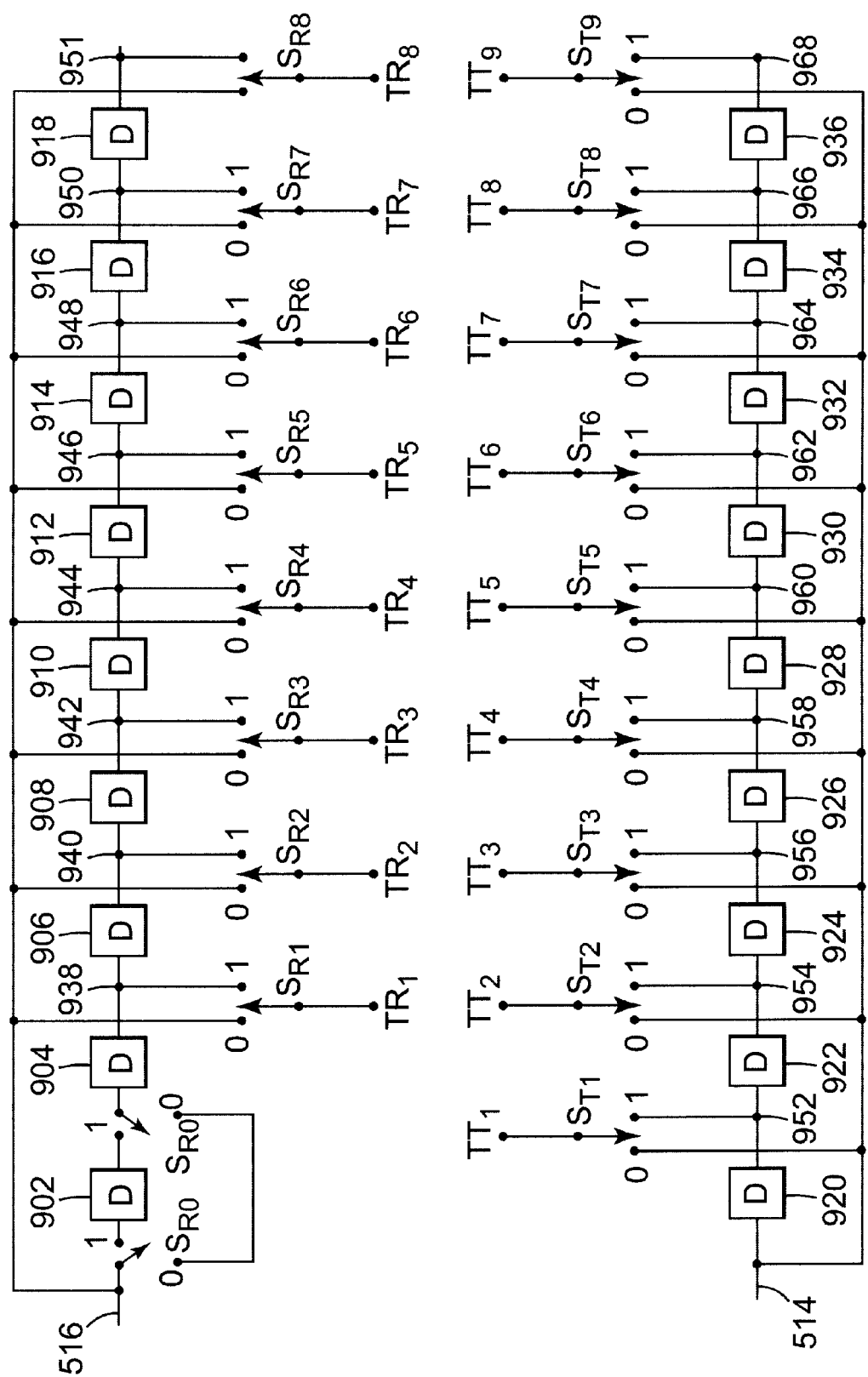
FIG. 9 shows a circuit in the trig box of FIG. 4 for scheduling the triggering of transmitting antenna and receive antenna.

FIG. 9 shows a trig box 422 circuit, consistent with this invention, for scheduling the triggering of transmitting antenna T1–T9 and receive antenna R1–R8. Trig box 422 receives a transmit timing input signal 514 and a receive timing input signal 516. Trig box 422 "splits" the transmit timing input signal 514 and receive timing input signal 516 and distributes the signal among transmit antenna T1–T9 and receive antenna R1–R8. For example, trigger signals TR1–TR8 are split from receive timing input signal 514. Trigger signals TT1–TT9 are split from transmit timing input signal 516. In this embodiment, trigger signals TR1–TR8 have the same shape as receive timing input signal 516, except with a possible delay. Likewise, trigger signals TT1–TT9 have the same shape as transmit timing input signal 514, except with a possible delay.

Trigger signals TT1–TT9 trigger when a pulse is transmitted from antenna array 106 by transmit antennae T1–T9, respectively. Trigger signals TR1–TR8 trigger when a sample is taken from the waveform received in array 106 by receive antennae R1–R8, respectively. For example, transmitting antennas T1–T9 may transmit at the falling edge of transmit timing output signal TT1–TT9. Receiving antennas R1–R8 may sample received waveforms at the falling edge of trigger signals TR1–TR8.

Trig box circuit 422 comprises a first delay circuit comprising delay elements 920–936 for receiving the transmit timing input signal 514 and generating a number of intermediate transmit timing signal 952–968 delayed with respect to each other by a delay time (D). Delay elements 920–936 may be very stable. For example, intermediate transmit timing signal 952 is transmit timing input signals 514, delayed by delay time D; intermediate transmit timing signal 954 is transmit timing input signal, delayed by a delay time 2D; intermediate transmit timing signal 856 is transmit timing input signal, but delayed by a delay time 3D; etc.

Trig box circuit 422 also comprises a transmit output switch circuit ST1–ST9 to select either the transmit timing input signal 514 or a corresponding one of the intermediate transmit timing signals 952–968 as corresponding trigger signals TT1–TT9. For example, trigger signal TT1 may be transmit timing input signal 514 when switch ST1 is in position O. Or, trig signal TT1 may be first intermediate transmit timing signal 952 when switch ST1 is in position 1. Trigger signal TT2 be transmit timing input signal 514 when switch ST2 is in position 1. Or, trig signal TT2 may be second intermediate timing signal 954 when switch ST1 is in position 1, etc. This allows any transmitting antenna to be first in line when transmitting, as explained below.

Trig box circuit 422 also comprises a second delay circuit 904–918 for receiving receive timing input signal 516 and generating a number of intermediate receive timing signals 938–951 delayed with respect to each other by the delay time (D). Delay circuit 904–918 may be very stable. For example, intermediate receive timing signal 938 is receive timing input signal 516, but delayed by delay time D; intermediate receive timing signal 954 is transmit timing input signal, but delayed by a delay time 2D; etc. The above example assumes that a double pole double throw switch SR0 is in position 0.

Trig box circuit 422 also comprises a shift-delay circuit 902 coupled to the second delay circuit 904–918 and receive timing input signal 516 to add the delay time (D) to the intermediate receive timing signals 938–951. For example, when switch SR0 is in position 0, then intermediate receive timing signals 938–950 are as in the above example. When switch SR0 is in position 1, then intermediate receive timing signal 938 is receive timing input signal 516, but delayed by delay time 2D; intermediate receive timing signal 954 is transmit timing during input signal, but delayed by a delay time 3D; etc.

Trig box circuit 422 also comprises a receive output switch circuit SR1–SR8 to select either the receive timing input signal 516 or a corresponding one of the intermediate receive timing signals 938–951 as corresponding trig signals TR1–TR8. For example, output receive timing signal TR1 may be either transmit timing input signal 516, or first intermediate transmit timing signal 938; trigger signal TR2 may be either transmit timing input signal 516, or second intermediate transmit timing signal 940; etc. This allows any receiving antenna to be first in line when transmitting, as explained below.

FIG. 10 is a signal diagram of transmit timing input signal 514 and receive timing input signal 516. Transmit timing input signal 514 and receive timing input signal 516 are each generated from a saw-tooth signal S. Transmit timing input signal 514 in this example is a periodic square wave, as described above with respect to FIG. 8 and shown in FIG. 10. Receive timing input signal 514, on the other hand, is a square wave with a varying period. Transmit trigger and receive trigger may occur at the falling edge of signals 514, 516 shown in FIG. 10.

Transmit timing input signal 514 feeds into trig box 422. If switch ST1 is in position 1, then transmit antenna T1 transmits an impulse at time 0+D, i.e., at the falling edge of transmit timing input signal 514 delayed by a time D. If switch SR0 is in position 0 and switch SR1 is in position 1; then receive antenna R1 samples a value of the received waveform at time 0+D−$t_1$. Thus, a sample is taken by receive antenna R1 at time $t_1$ before the impulse is transmitted.

In this example, transmit antenna T1 also transmits an impulse at time 0+T+D, i.e., at the falling edge of transmit timing input signal 514 delayed by a time D. Receive antenna R1 samples a value of the received waveform at time 0+T+D−$t_2$. thus, a sample is taken at time t2 before the impulse is transmitted, etc. The time between the receive trig and transmit trig become smaller and time t4 in FIG. 10 is the first event when a value of the received waveform is sampled after the impulse is transmitted. The time between the transmit trig and receive trig then increases.

FIG. 10 may be more easily understood if the falling edge of 514 is defined as 0 in each period. The times $t_1$ through $t_5$ then start negative, become smaller, then become positive, and finally increase. In this manner, the received waveforms are sampled at different points along the waveform. The same pattern results with respect to antenna pairs R2 and T2, R3 and T3, etc., on down the line.

In the above examples, R1 is "paired" with T1. If switch SR0 is in position 1, however, then R1 is paired with T2. In this case, R1 is paired with T2 because there is a delay of 2D before both intermediate trig signal 938 and intermediate trig signal 954. Thus, R1–R8 are paired with T1–T8 when switch SR0 in position 0. Alternatively, R1–R8 are paired with T2–T9 when switch SR0 is in position 1.

Switches SR1–SR8 and switches ST1–ST2 also play a role in pairing. Any or all signals TR1–TR8 can be the receive timing input signal 516 without any delay. This allows any or all receiving antennas to be first in line when receiving. Further, any or all signals TT1–TT9 can be the transmit timing input signal 514 without any delay. This allows any transmitting antenna to be first in line when transmitting. Thus, any or any receivers R1–R8 can be paired with any transmitter T1–T9. In other words, methods or systems consistent with this invention provide means for selectively enabling each of the receive antennas to receive reflected energy from any one of the transmit antennas. Methods or systems consistent with this invention may pair any transmitter to any receiver.

Figure 11:
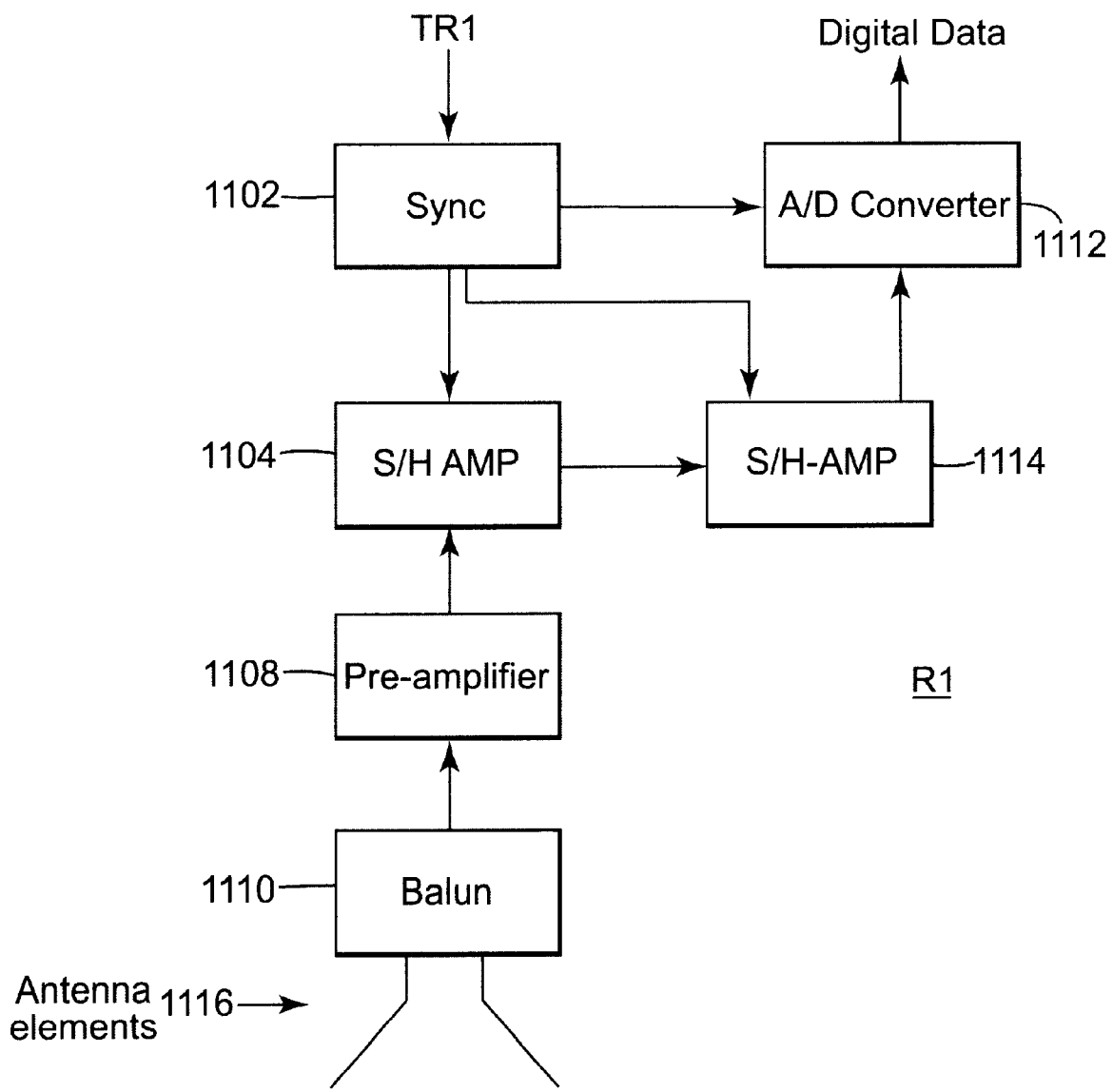
FIG. 11 is a block diagram of a receiving antenna comprising a receive balun, a pre-amplifier, a first and second sample and hold circuits, an analog to digital converter, and sync-timer.

FIG. 11 is a block diagram of receiving antenna R1, consistent with this invention, comprising a receive balun 1110, a pre-amplifier 1108, first and second sample and hold (S/H) amplifiers 1104 and 1114, an analog to digital (A/D) converter 1112, and a sync-timer 1102. Antenna elements 1116 receive reflected waveforms that are amplified by pre-amplifier 1108. Receive balun 1110 may match the impedance of the antenna elements to the coaxial feed-lines (not shown). The received waveform is then sampled by first S/H amplifier 1104 at a time specified by sync-timer 1102. Sync-timer 1102 specifies when to sample the received waveform at, for example, the falling edge of trigger signal TR1. Because of the high frequency of the received waveform, it may be necessary to use two S/H amplifiers to preserve dynamic range. Thus, the output of first S/H amplifier 1104 is fed into second S/H amplifier 1114. Second S/H amplifier 1114 samples the output of first S/H 1104 at a time shortly after first S/H 1104 sampled the received waveform, as specified by sync-timer 1102. Sync-timer 1102 specifies when second S/H amplifier should sample at, for example, a small time after the falling edge of trigger signal TR1. The output of second S/H amplifier 1114 is fed into A/D converter 1112 and output to trig box 422 in a serial format. The A/D converter 1112 may also use the output of sync-timer 1102.

Figure 12:
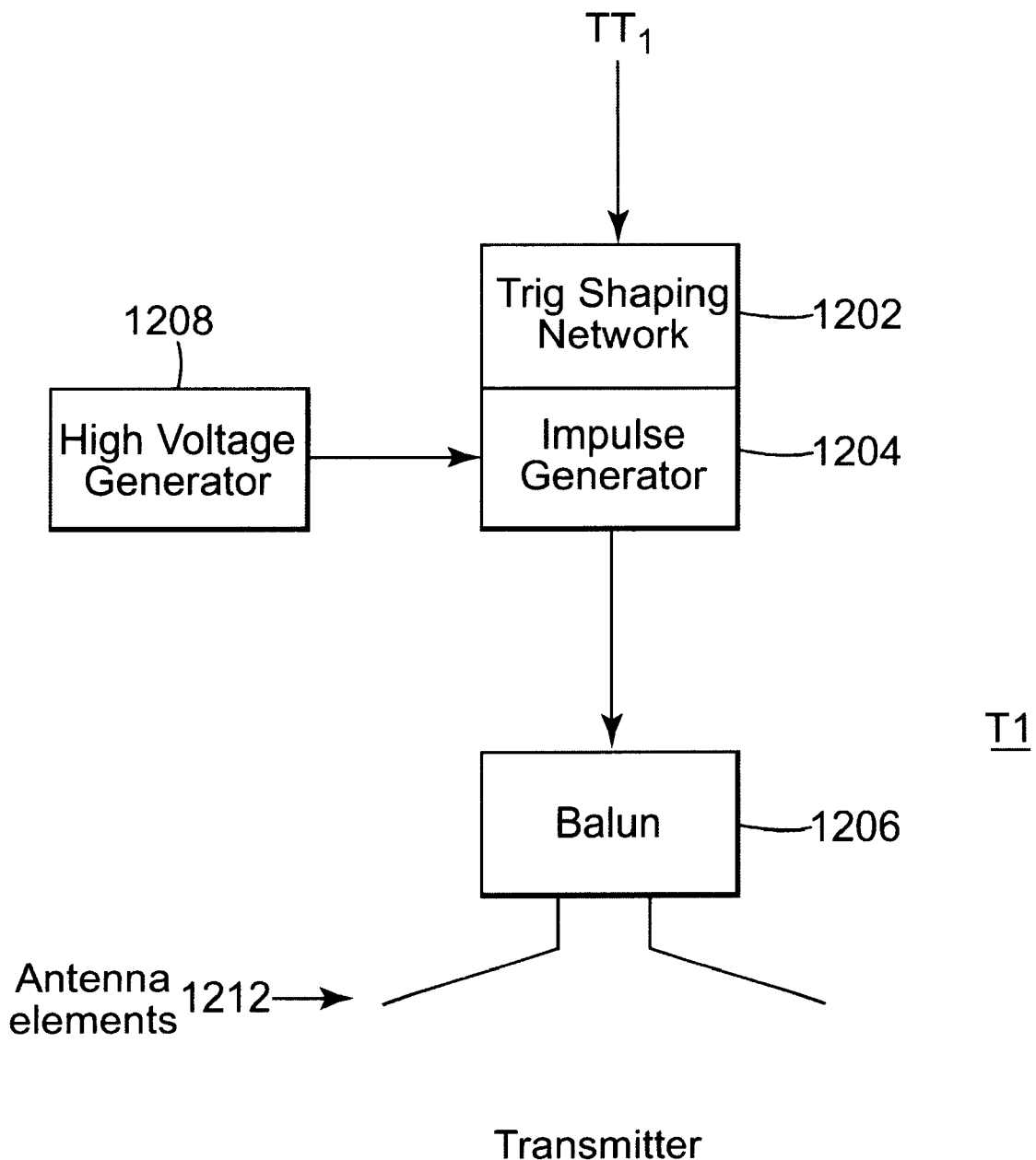
FIG. 12 is a block diagram of transmitter, consistent with this invention, comprising a transmit balun, antenna elements, an impulse generator, a trig shaping network, and a high voltage generator.

FIG. 12 is a block diagram of transmitter T1 comprising a transmit balun 1206, antenna elements 1212, an impulse generator 1204, a trig shaping network 1202, and a high voltage generator 1208. Trig shaping network 1202 and impulse generator 1204 create a well shaped impulse that is fed through to radiating antenna elements 1212. For example, trig shaping network 1202 forms a trig signal with sharp edges and sufficient electrical current. Transmitting balun 1206 matches the impedance between the coaxial line (not shown) and antenna elements 1212. Impulse generator 1204 may be powered by a high voltage generator 1208 of approximately 600 V. The radiating element of transmit antenna T1 may be a bow-tie type antenna, which is well known in the art. Other types of antennas that may be used include resistively loaded dipoles and cavity backed dipoles. The same types of antennas may be used for receiving and transmitting elements. Transmit antenna T1–T9 may transmit with a center frequency of 200 MHz and a bandwidth of 300 MHz. Other frequencies are possible including at least 300 MHz, 400 MHz, and 500 Mz.

The timing circuit described above may be optimized for use with an antenna array. This means that the timing circuit controls the antenna array in a way that enables each antenna to work at a higher firing/digitizing rate, i.e., approximately 100 kHz. The individual transmit antennas may each have its own high-voltage impulse generator and the receiving antenna may each have its own digitizer (sampler based and A/D-converter) in order to support high-speed operation of the array.

Figure 13:
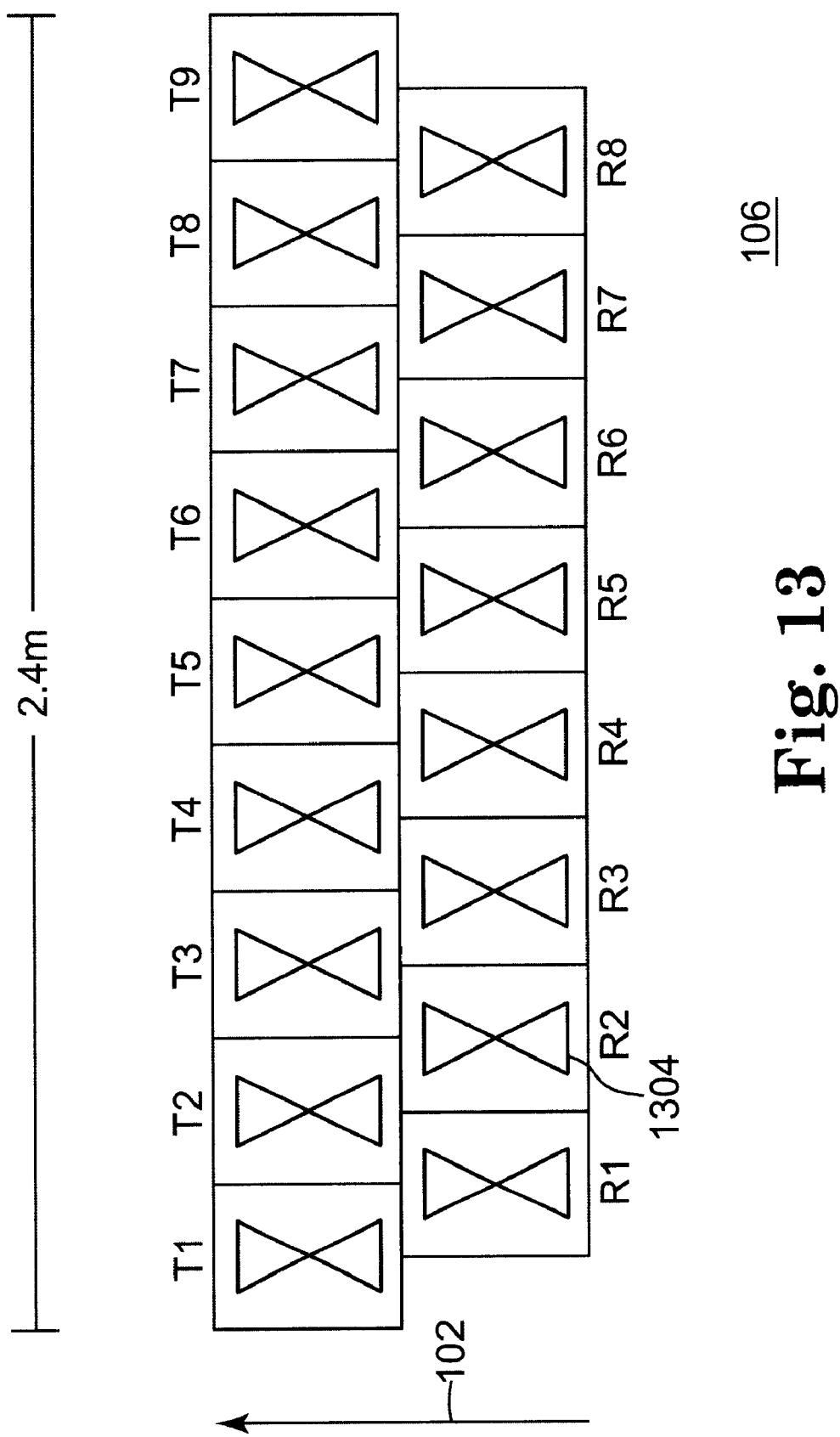
FIG. 13 is a diagram of one possible layout of an antenna array, consistent with this invention, comprising nine transmit antennas and eight receive antennas.
Figure 15A:
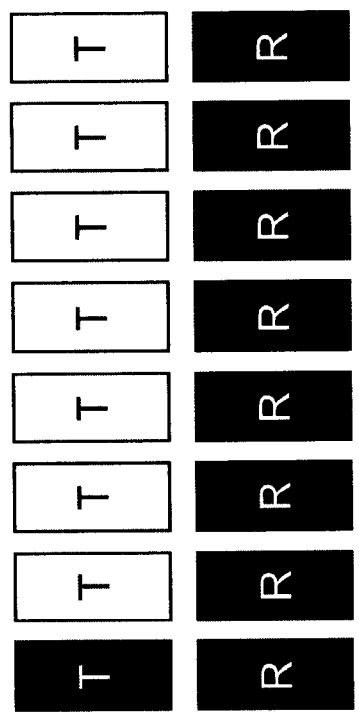
FIGS. 15 (a)–15(d) are diagrams, consistent with this invention, of examples of possible antenna pairing scheme for transmit antenna and receive antenna for "bistatic" or "multistatic" measurement.
Figure 15B:
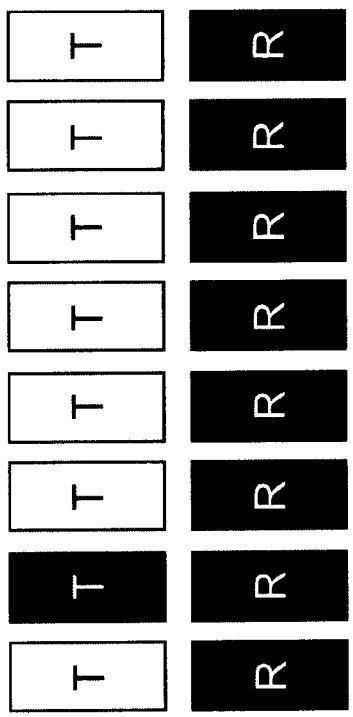
Figure 15C:
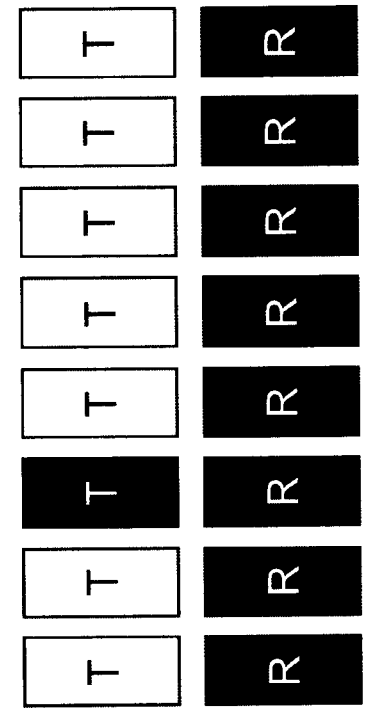
Figure 15D:
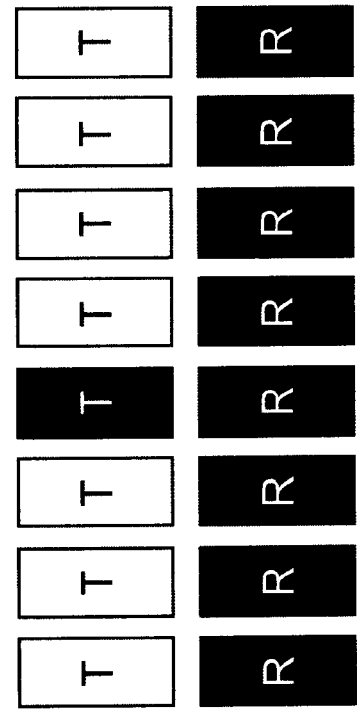

FIG. 13 is a diagram of one possible layout of antenna array 106, consistent with this invention, comprising nine transmit antennas T1–T9 and eight receive antennas R1–R8. Referring to FIG. 13, transmit antennas T1–T9 may be linearly arranged. Further, receive antennas R1–R8 may also be linearly arranged and parallel to the transmit antennas. Also, receive antennas R1–R8 and transmit antennas T1–T9 may be offset from each other in the linear direction one half the width of the antennas.

In systems consistent with this invention, the length of antenna array 106 is approximately 2.4 meters. This length allows array 106 to easily fit on the back of vehicle 104. The length of array 106 and the motion of vehicle 104 allow a large area of ground to be covered by the GPR system.

In systems consistent with this invention, one transmitting antenna may transmit at a given time and one or more receive antenna may receive at a given time. FIGS. 14(a)–14(d) are diagrams, consistent with this invention, of a possible antenna pairing scheme for transmit antenna and receive antenna for "monostatic" radar measurement. In FIGS. 14(a)–14(d), "T" indicates a transmitting antenna and "R" a receiving antenna. The antennae shaded in black are active while those not shaded are inactive. FIGS. 14(a)–14(d) show the progression of pairings. In FIGS. 14(a)–14(d) there is one receive antenna paired to every transmit antenna.

FIGS. 15(a)–15(d) are diagrams, consistent with this invention, of another possible antenna pairing for "bistatic" or "multistatic" measurement. Again, "T" indicates a transmitting antenna and "R" indicates a receiving antenna, and antennae shaded in black are active while those not shaded are inactive. FIGS. 15(a)–15(d) show the progression of pairings. In FIGS. 15(a)–15(d) there are a plurality of receive antennas paired to every transmit antenna.

The antenna array configuration shown in FIGS. 14(a)–14(d) and FIGS. 15(a)–15(d) is different than that show in FIG. 12, but is an alternative to that in FIG. 13.

Figure 16A:
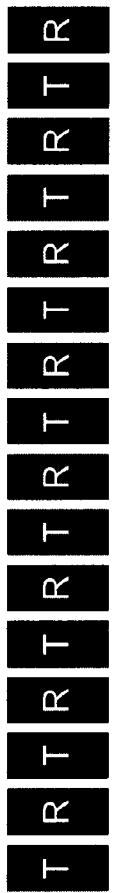
FIGS. 16(a)–16(c) are diagrams, consistent with this invention, of examples of possible antenna configurations.
Figure 16B:
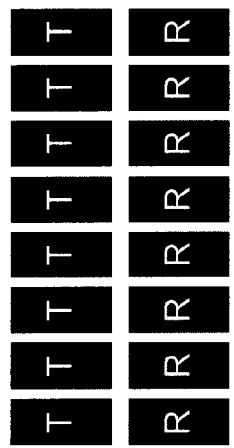
Figure 16C:
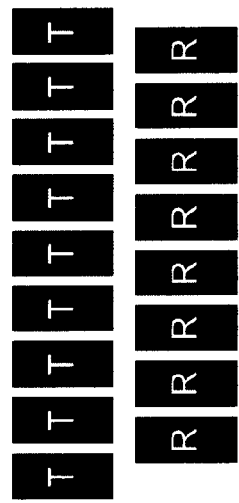

FIGS. 16(a)–16(c) are diagrams, consistent with this invention, of other possible antenna configurations. In FIG. 16(a), the transmit and receive antenna alternative and are linearly arranged. In FIG. 16(b), the transmit antenna and receive antenna are as shown in FIG. 11, except the receive antenna are not offset in the parallel direction from the transmit antenna and there is an equal number of transmit antenna and receive antenna. FIG. 16(c) is similar to FIG. 13.

The description of the invention does not limit the invention. Instead, it provides examples and explanations to allow persons of ordinary skill to appreciate different ways to practice the invention. The following claims define the true scope and spirit of the invention.

What is claimed is:

1. An apparatus for identifying a buried object using array-based ground penetrating radar having a control device, a plurality of transmit antennas, and a plurality of receive antennas, said control device receiving a transmit timing input signal and a receive timing input signal, said apparatus comprising:

a first delay circuit receiving the transmit timing input signal and generating a number of intermediate transmit timing signals delayed with respect to each other by a delay time;

transmit output switch circuit to select either the transmit timing input signal or a corresponding one of the intermediate transmit timing signals as a corresponding output transmit timing signal;

a second delay circuit receiving the receive timing input signal and generating a number of intermediate receive timing signals delayed with respect to each other by the delay time;

a shift-delay circuit coupled to the second delay circuit and the receive timing input signal to add the delay time to the intermediate receive timing signals; and receive output switch circuit to select either the receive timing input signal or a corresponding one of the intermediate receive timing signals as a corresponding output receive timing signal.

2. The apparatus of claim 1, further comprising:

an element to trigger one of the plurality of transmit antennas to transmit dependent on the output transmit timing signal; and an element to trigger one of the plurality of receive antennas to sample a received waveform dependent on the output receive timing signal.

3. The apparatus of claim 2, further comprising a monostatic data acquisition controller.

4. The apparatus of claim 1, further comprising a first comparator wherein the transmit timing input signal is derived by comparing a common timing signal to a transmit threshold signal, and a second comparator wherein the receive timing input signal is derived by comparing the common timing signal to a receive threshold signal.

5. The apparatus of claim 1, wherein the first delay circuit comprises a first plurality delay elements, the second delay circuit comprises a second plurality of delay elements, and the shift-delay circuit comprises a shift-delay element.

6. The apparatus of claim 5, wherein all the delay elements are of the same value.

7. The apparatus of claim 1, wherein the apparatus further comprises a mobile housing for moving the apparatus along terrain under which the object is buried.

8. A method for identifying a buried object using array-based ground penetrating radar having a control device, a plurality of transmit antennas, and a plurality of receive antennas, said control device receiving a transmit timing input signal and a receive timing input signal, the method comprising:

generating a plurality of intermediate transmit timing signals by delaying the transmit timing input signal by a plurality of delay times;

selecting either the transmit timing input signal or a corresponding one of the intermediate transmit timing signals as a corresponding output transmit timing signal;

generating a number of intermediate receive timing signals by delaying the receive timing input signal by the plurality of delay times; and selecting either the receive timing input signal or a corresponding one of the intermediate receive timing signals as a corresponding output receive timing signal.

9. The method of claim 8, further comprising adding a second delay time to the intermediate receive timing signals.

10. The method of claim 8, further comprising triggering one of the plurality of transmit antennas to transmit dependent on the output transmit timing signal; and triggering one of the plurality of receive antennas to sample a received waveform dependent on the output receive timing signal.

11. The method of claim 10, further comprising acquiring data with a monostatic data acquisition controller.

12. The method of claim 8, further comprising comparing a common timing signal to a transmit threshold signal to derive the transmit timing input signal; and comparing the common timing signal to a receive threshold signal to derive the receive timing input signal.

13. An apparatus for identifying a buried object using array-based ground penetrating radar having an antenna array, said antenna array comprising:

a plurality of transmit antennas, a plurality of receive antennas transmitting digital data to a control unit simultaneously and means for selectively enabling the transmit and receive antennas to allow each of the receive antennas to receive energy from any one of the transmit antennas.

14. The apparatus of claim 13, wherein a plurality of the transmit antenna each have an impulse generator and a high-voltage generator.

15. The apparatus of claim 13, wherein a plurality of the receive antennas each have a sample and hold amplifier and an analog to digital converter.

16. The apparatus of claim 13, wherein two positioning devices are used to determine a direction of movement.

17. A control device for an impulse radar having a plurality of transmit antennas and a plurality of receive antennas, said control device receiving a transmit timing input signal and a receive timing input signal, comprising:

a first delay circuit receiving the transmit timing input signal and generating a number of intermediate transmit timing signals delayed with respect to each other by a delay time;

transmit output switch circuit to select either the transmit timing input signal or a corresponding one of the intermediate transmit timing signals as a corresponding output transmit timing signal;

a second delay circuit receiving the receive timing input signal and generating a number of intermediate receive timing signals delayed with respect to each other by the delay time;

a shift-delay circuit coupled to the second delay circuit and the receive timing input signal to add the delay time to the intermediate receive timing signals; and receive output switch circuit to select either the receive timing input signal or a corresponding one of the intermediate receive timing signals as a corresponding output receive timing signal.

18. The control device of claim 17, further comprising
an element to trigger one of the plurality of transmit antennas to transmit dependent on the output transmit timing signal; and
an element to trigger one of the plurality of receive antennas to sample a received waveform dependent on the output receive timing signal.

19. The control device of claim 18, further comprising a monostatic data acquisition controller.

20. The control device of claim 17, further comprising
a first comparator wherein the transmit timing input signal is derived by comparing a common timing signal to a transmit threshold signal, and
a second comparator wherein the receive timing input signal is derived by comparing the common timing signal to a receive threshold signal.

21. The common device of claim 17, wherein the first delay circuit comprises a first plurality delay elements, the second delay circuit comprises a second plurality of delay elements, and the shift-delay circuit comprises a shift-delay element.

22. The control device of claim 21, wherein all the delay elements are of the same value.

23. The control device of claim 17, wherein the control device further comprises a mobile housing for moving the control device along terrain under which the object is buried.

24. An apparatus for identifying a buried object using array-based ground penetrating radar having a control device, a plurality of transmit antennas, and a plurality of receive antennas, said control device receiving a transmit timing input signal and a receive timing input signal, the apparatus comprising:
means for generating a plurality of intermediate transmit timing signals by delaying the transmit timing input signal by a plurality of delay times;
means for selecting either the transmit timing input signal or a corresponding one of the intermediate transmit timing signals as a corresponding output transmit timing signal;
means for generating a number of intermediate receive timing signals by delaying the receive timing input signal by the plurality of delay times; and
means for selecting either the receive timing input signal or a corresponding one of the intermediate receive timing signals as a corresponding output receive timing signal.

25. The apparatus of claim 24, further comprising means for adding a second delay time to the intermediate receive timing signals.

26. The apparatus of claim 24, further comprising
means for triggering one of the plurality of transmit antennas to transmit dependent on the output transmit timing signal; and
means for triggering one of the plurality of receive antennas to sample a received waveform dependent on the output receive timing signal.

27. The apparatus of claim 26, further comprising means for acquiring data with a monostatic data acquisition controller.

28. The apparatus of claim 26, further comprising
means for comparing a common timing signal to a transmit threshold signal to derive the transmit timing input signal; and
means for comparing the common timing signal to a receive threshold signal to derive the receive timing input signal.

29. The apparatus of claim 24, wherein the first delay circuit comprises a first plurality delay elements, the second delay circuit comprises a second plurality of delay elements, and the shift-delay circuit comprises a shift-delay element.

30. The apparatus of claim 27, wherein all the delay elements are of the same value.

31. The apparatus of claim 24, wherein the apparatus further comprises a mobile housing for moving the apparatus along terrain under which the object is buried.

* * * * *

UNITED STATES PATENT AND TRADEMARK OFFICE
CERTIFICATE OF CORRECTION

PATENT NO.     : 6,496,137 B1
DATED          : December 17, 2002
INVENTOR(S)    : Bernth Å.T. Johansson It is certified that error appears in the above-identified patent and that said Letters Patent is hereby corrected as shown below:

Column 6,
Line 20, delete "TR8" and insert therefor -- TR9 --

Column 10,
Line 42, after "R" insert -- indicates --

Column 14,
Line 23, delete "26" and insert therefor -- 24 --
Line 34, delete "27" and insert therefor -- 29 --

Signed and Sealed this

Nineteenth Day of August, 2003

JAMES E. ROGAN
*Director of the United States Patent and Trademark Office*